Figure 1:
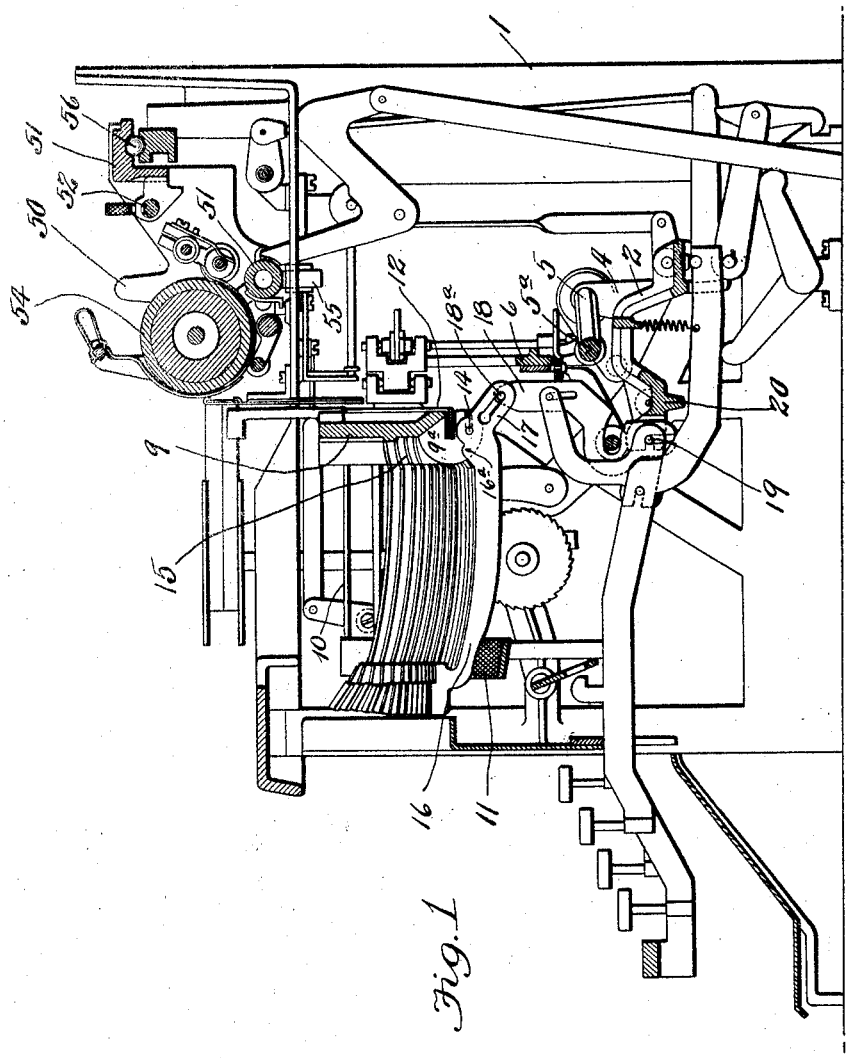

O. THIEME.
TYPE WRITING MACHINE.
APPLICATION FILED OCT. 9, 1916.

1,301,335.

Patented Apr. 22, 1919.
14 SHEETS—SHEET 1.

Witnesses;
J. Adolph Bishop
Wm Janice

Inventor:
Otto Thieme,
By F. P. Cornwall.
Atty

O. THIEME.
TYPE WRITING MACHINE.
APPLICATION FILED OCT. 9, 1916.

1,301,335.

Patented Apr. 22, 1919.
14 SHEETS—SHEET 6.

Inventor,
Otto Thieme,
By J. R. Cornwall, Atty

O. THIEME.
TYPE WRITING MACHINE.
APPLICATION FILED OCT. 9, 1916.
1,301,335.
Patented Apr. 22, 1919.
14 SHEETS—SHEET 7.
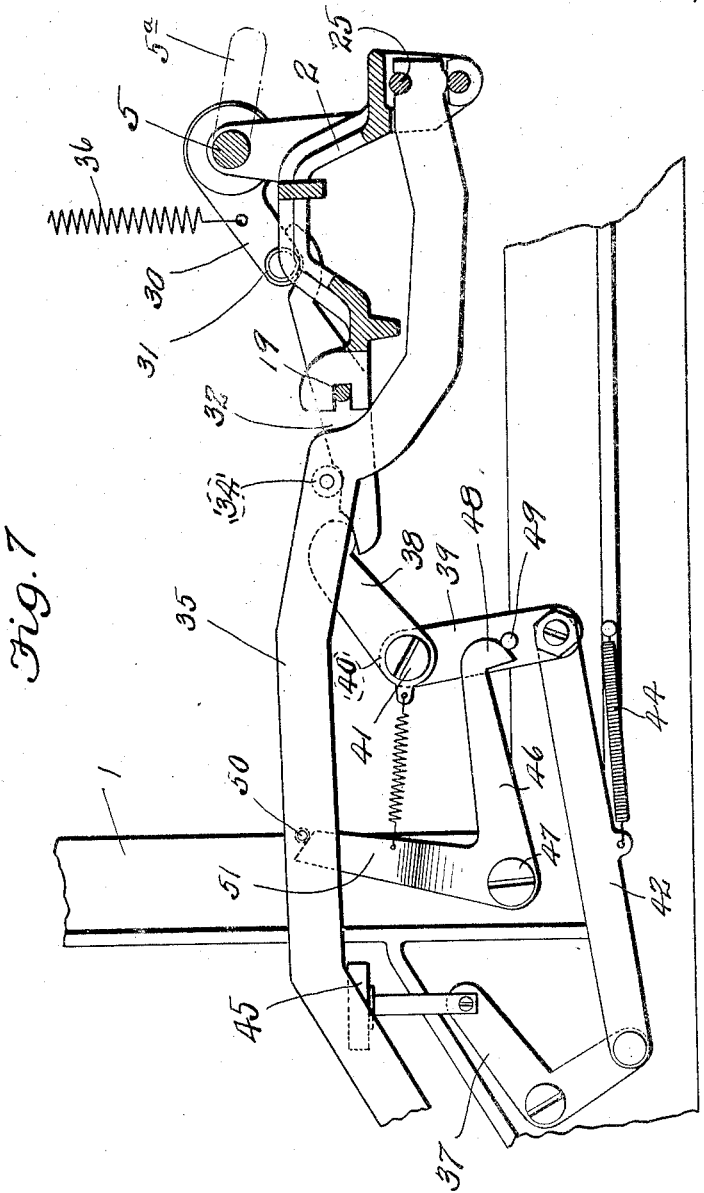
Witnesses;
J. Adolph Bishop
Wm Janus
Inventor,
Otto Thieme,
By F. R. Cornwall
Atty.

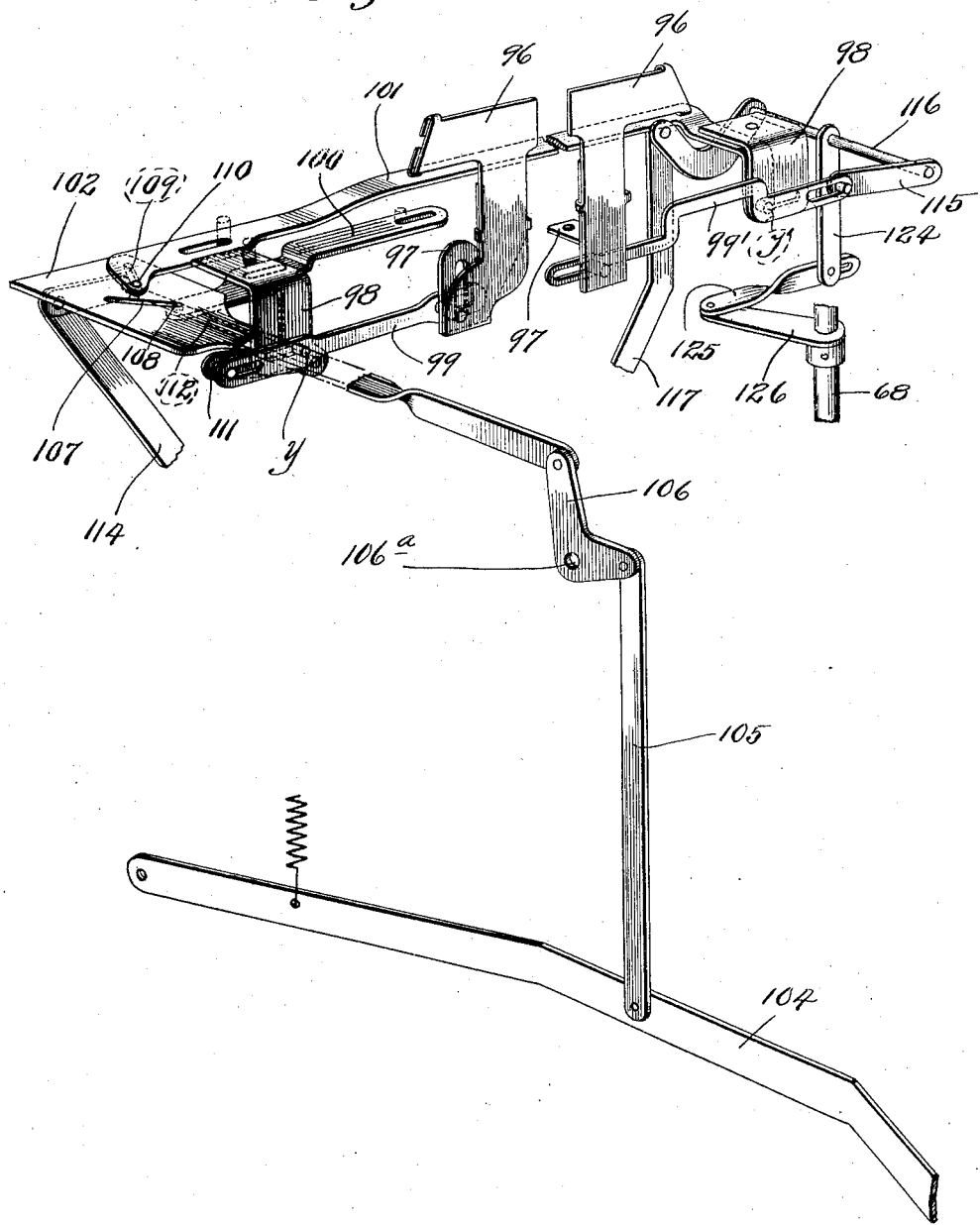

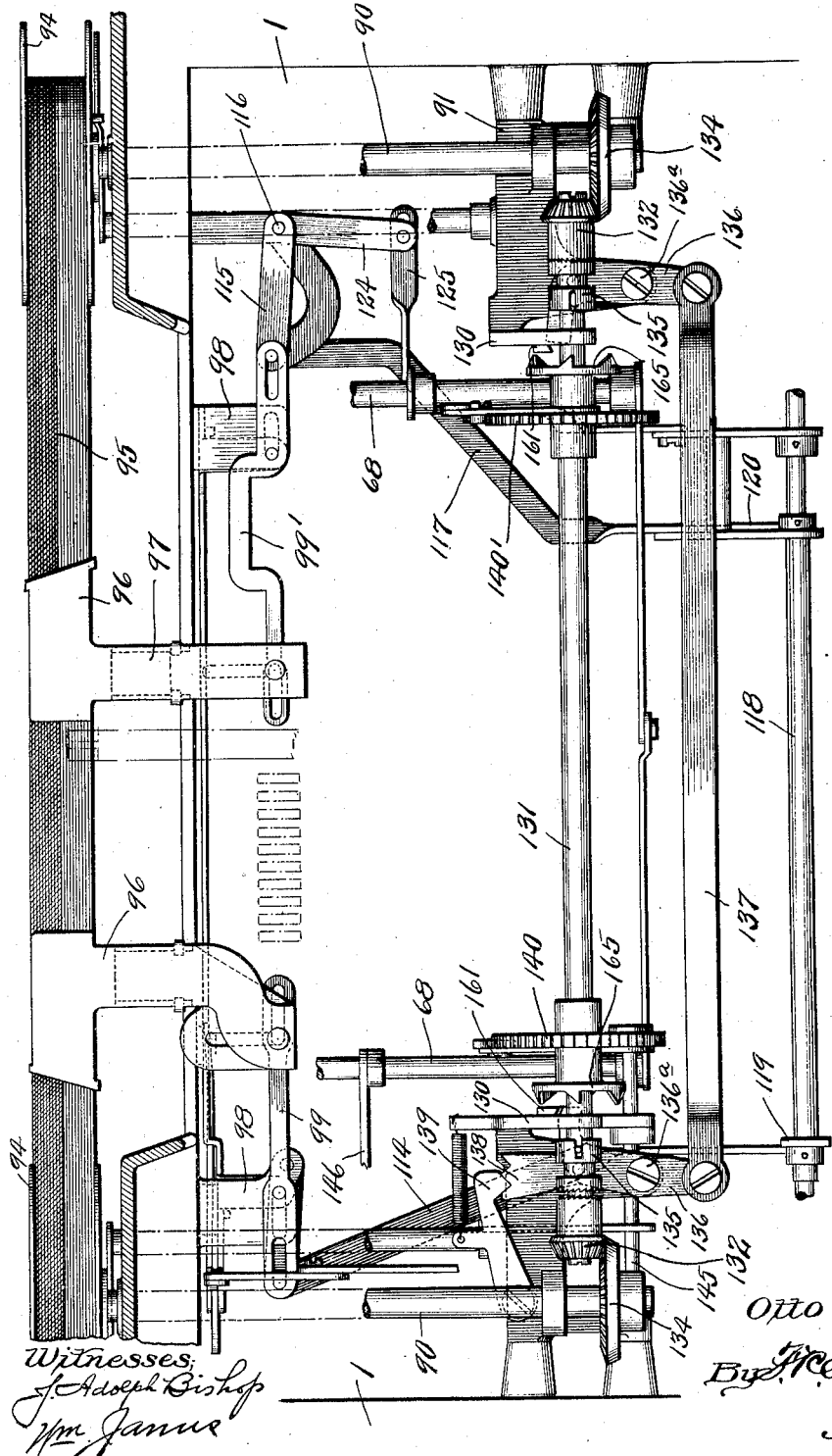

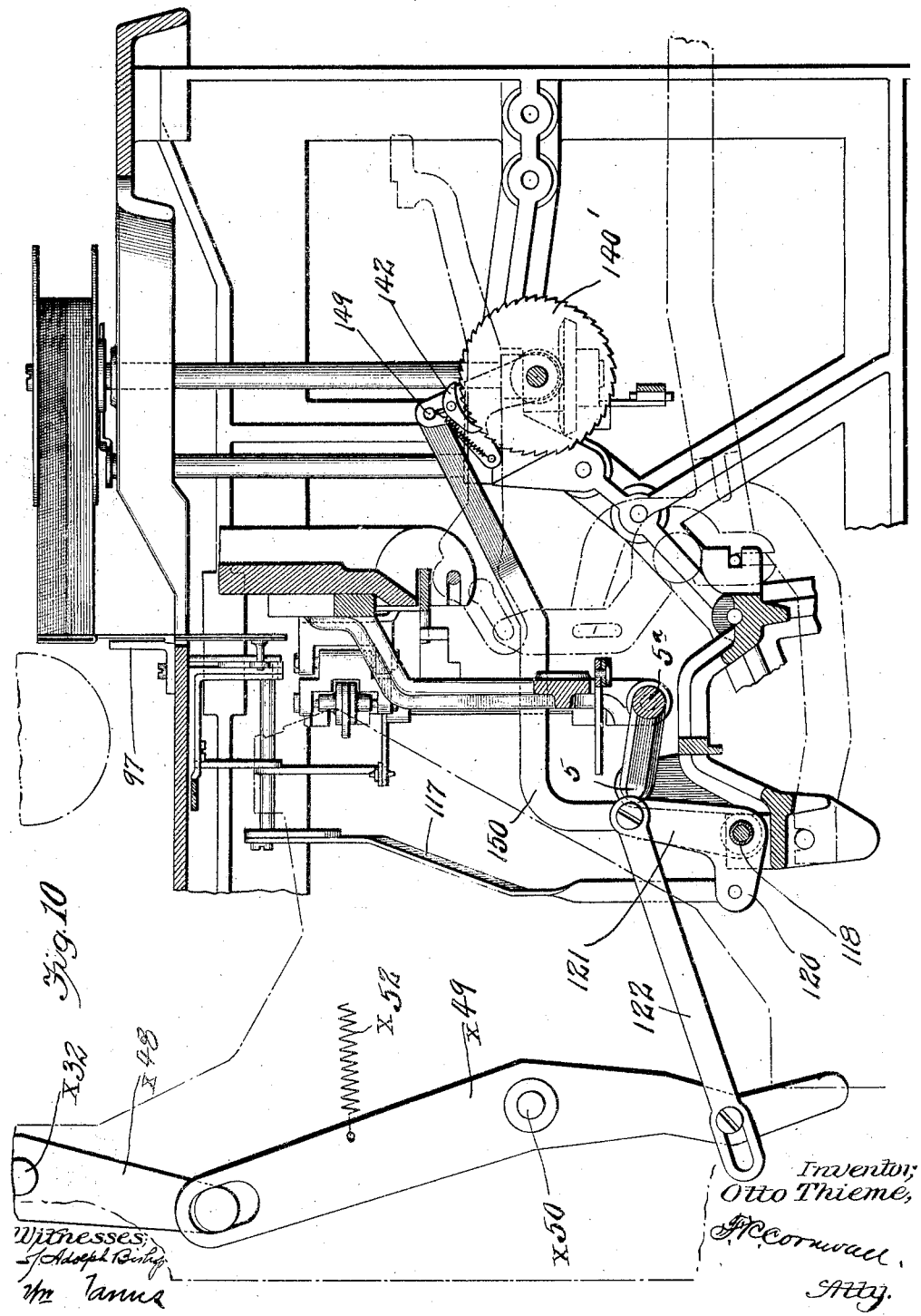

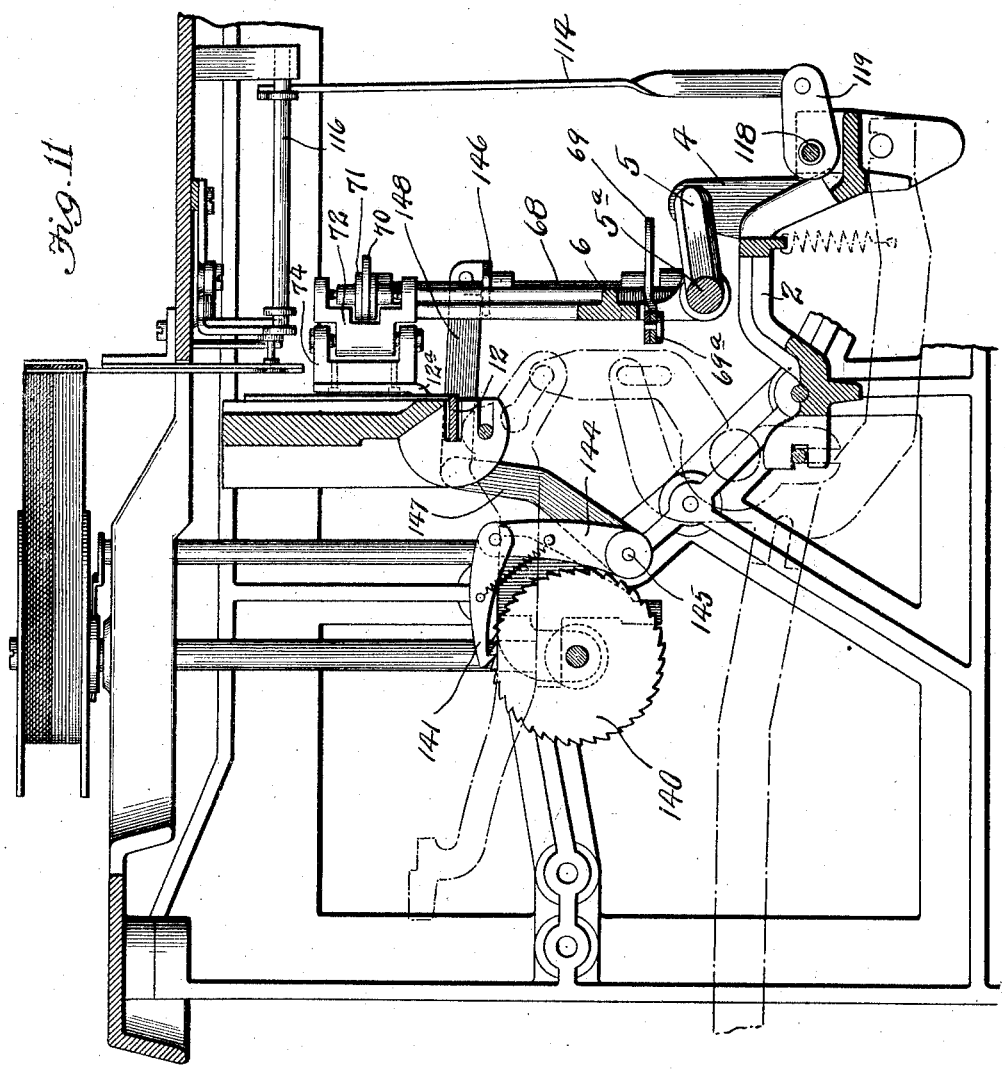

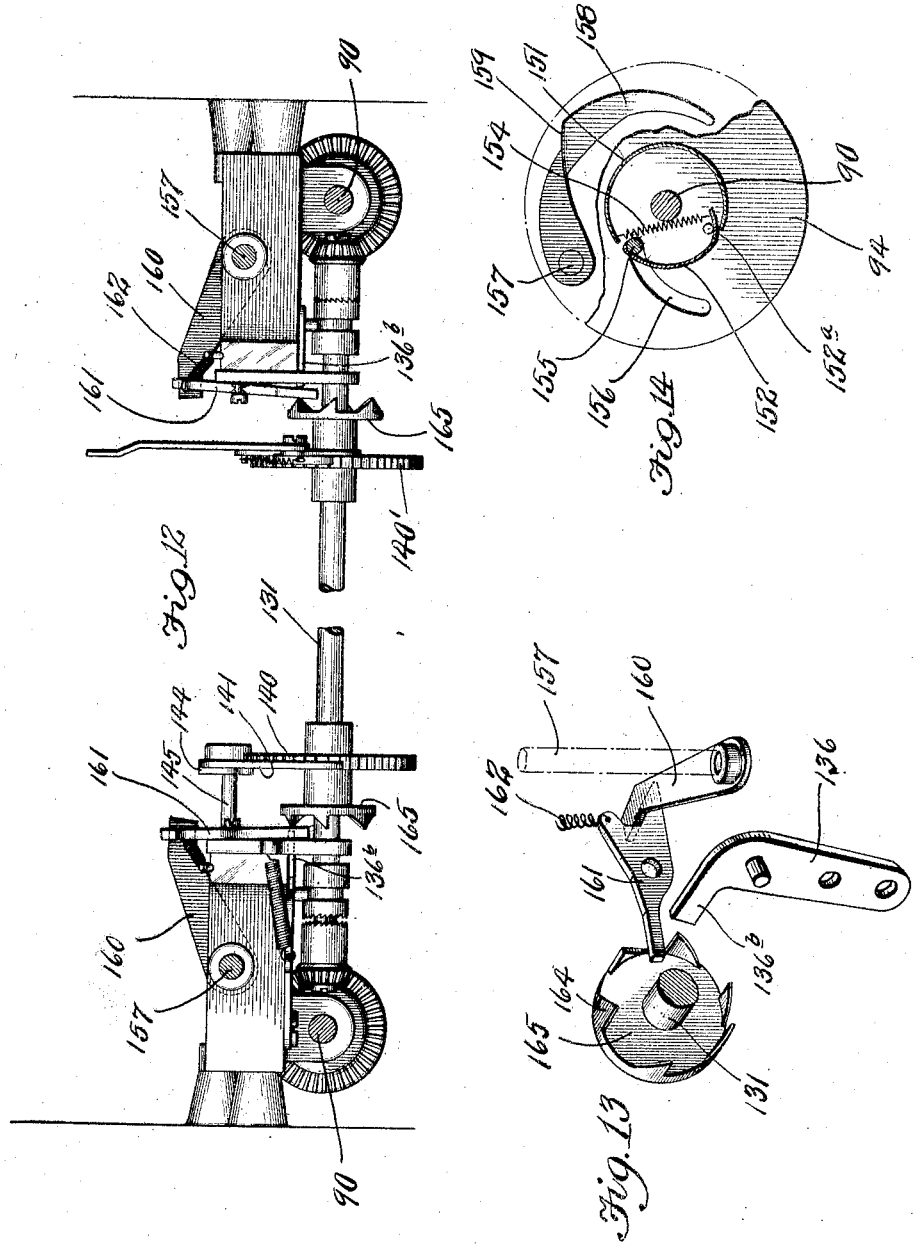

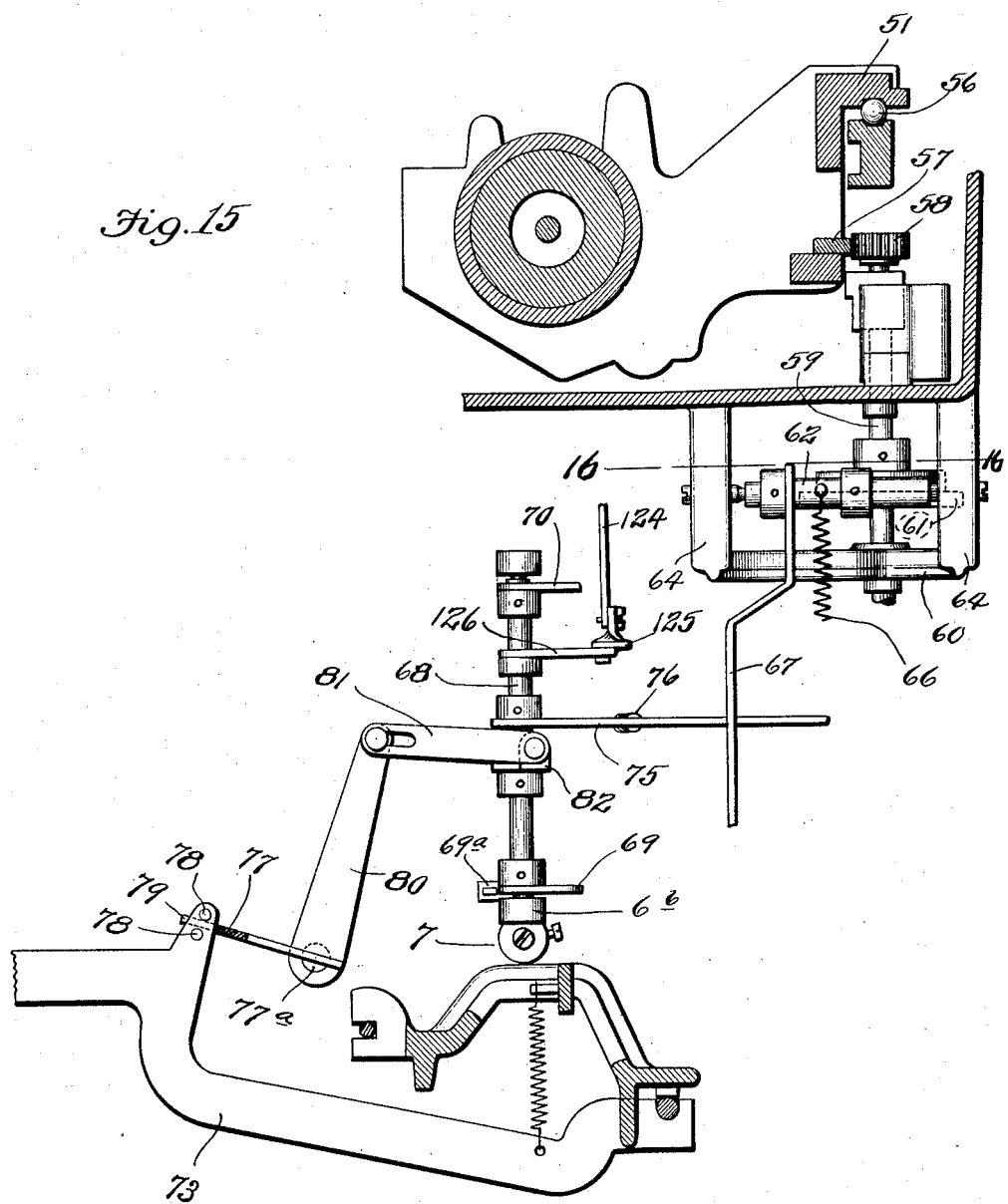

O. THIEME.
TYPE WRITING MACHINE.
APPLICATION FILED OCT. 9, 1916.
1,301,335.
Patented Apr. 22, 1919.
14 SHEETS—SHEET 14.
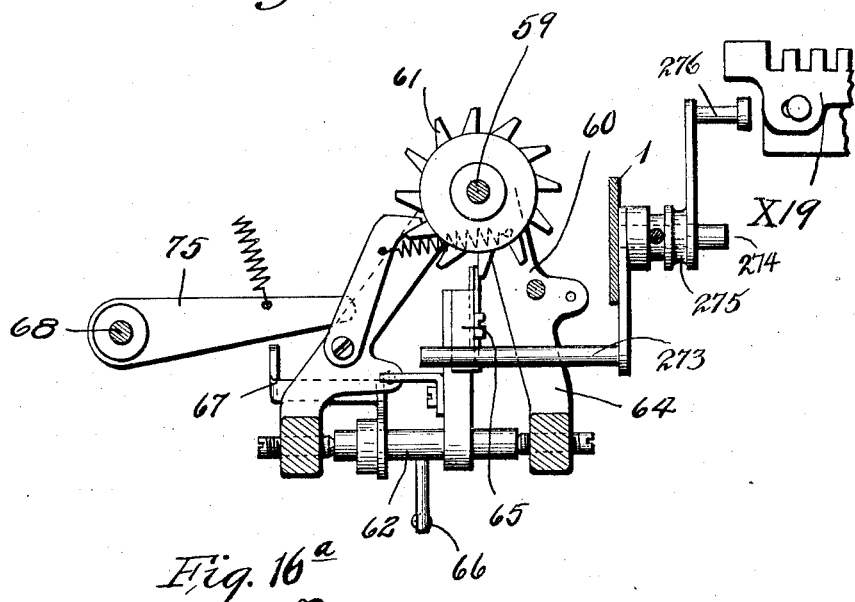
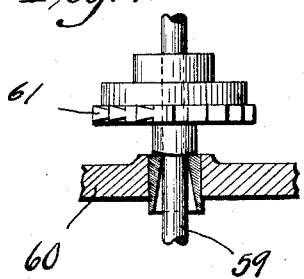
Inventor
Otto Thieme
By J.R. Cornwall, Att'y

UNITED STATES PATENT OFFICE.

OTTO THIEME, OF ST. LOUIS, MISSOURI, ASSIGNOR TO MOON-HOPKINS BILLING MACHINE COMPANY, OF ST. LOUIS, MISSOURI, A CORPORATION OF MISSOURI.

TYPE-WRITING MACHINE.

1,301,335.  Specification of Letters Patent.  Patented Apr. 22, 1919.

Application filed October 9, 1916. Serial No. 124,659.

*To all whom it may concern:*

Be it known that I, OTTO THIEME, a citizen of the United States, residing at the city of St. Louis, State of Missouri, have invented a certain new and useful Improvement in Type-Writing Machines, of which the following is a full, clear, and exact description, such as will enable others skilled in the art to which it appertains to make and use the same, reference being had to the accompanying drawings, forming part of this specification.

This invention relates to certain improvements in typewriting machines, and relates primarily to key-operated machines of the type bar type.

The general object which I have in view is the provision of a typewriting machine which shall constitute a part of a machine now commonly known as a billing machine, and which is characterized by a coöperative arrangement of typewriting and computing mechanism whereby both the mechanically operated printing mechanism of the computing machine and the manually operated printing mechanism of the typewriting machine may be operated to print upon a sheet of paper carried by a carriage which is common to the two mechanisms, so that the legends printed by the respective mechanisms may be associated with one another at the selection of the operator in any of the numerous various relationships incident to various methods of bookkeeping, billing, invoicing, and other commercial recording.

The more definite object which I have in view is the provision of an improved typewriting machine construction which is designed for association with the computing mechanism as above explained, in such fashion that the printing points of both mechanisms may be always visible to the operator, and in addition thereto. that the carriage be visible throughout its entire extent along the printing line, so that the relationship of all legends on the line may be ascertainable at a glance without the manipulation of the carriage or other parts of the mechanism.

While the objects above designated are not original with me, and my invention, therefore, does not reside in the provision of a combined computing and typewriting machine, or in the provision of such a machine having a visible printing line, the structure by which I have attained these objects embodies many novel features of construction, and the equipment and organization of the machine for its coöperative function with the computing machine, particularly with respect to movement and manipulation of the paper carriage, involve the provision of various novel features of equipment.

The salient objects of the several novel features of construction which I claim as my invention, will be indicated as each feature is described, while other objects will be obvious upon an understanding of the device.

The accompanying drawings illustrate an embodiment of my improvements—

Figure 2:
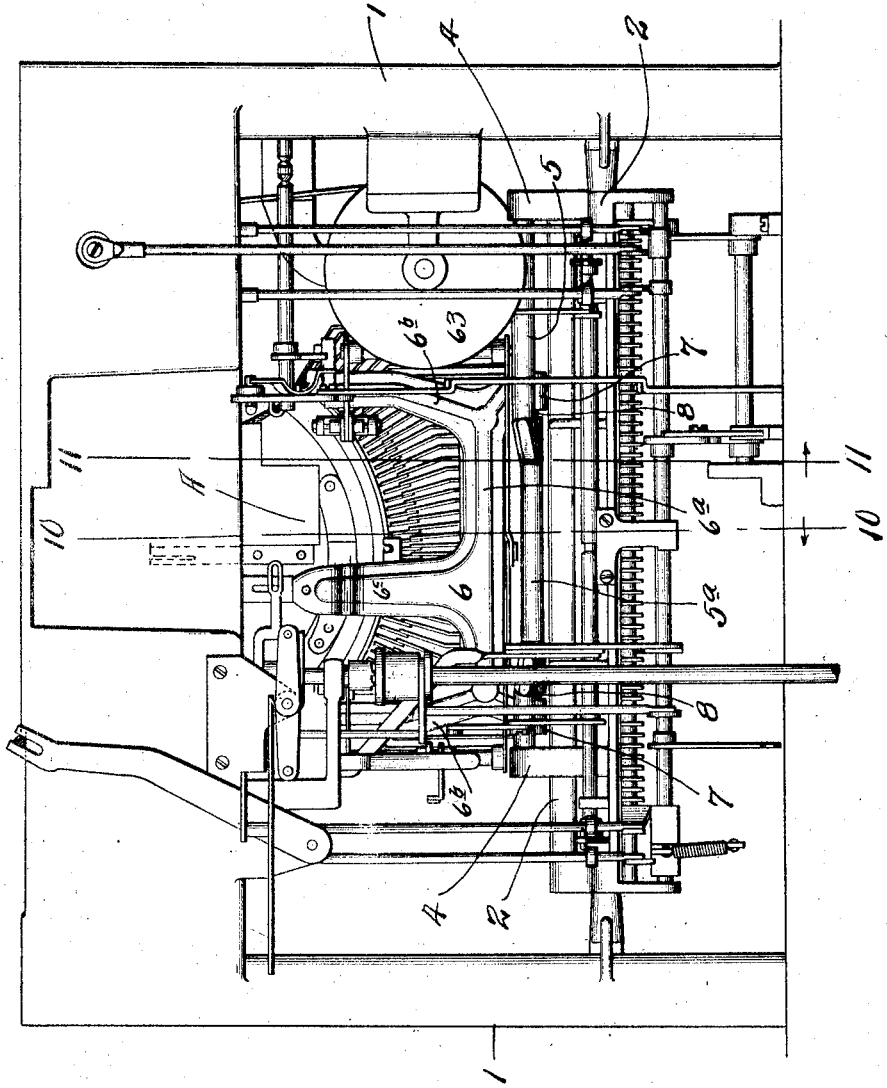
Figure 3:
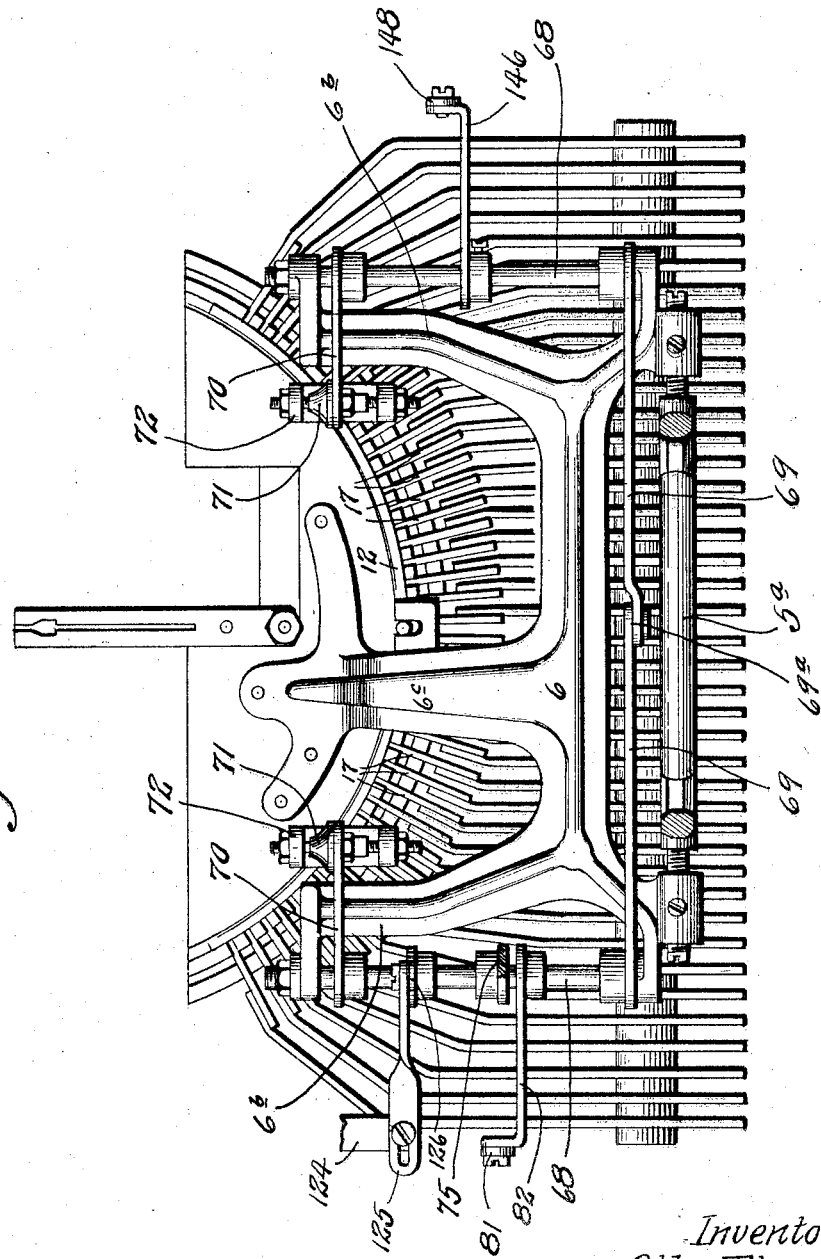
Figure 4:
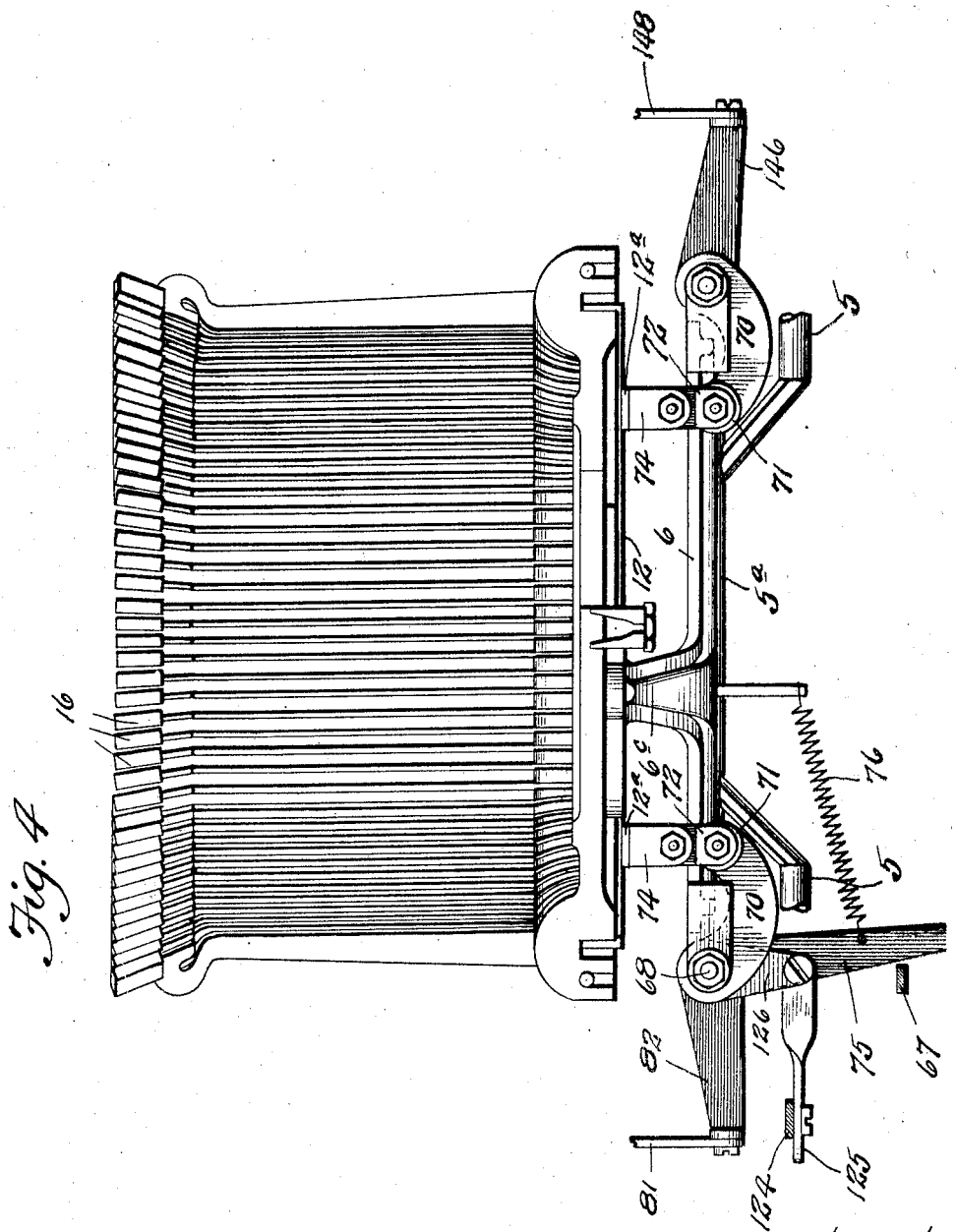
Figure 5:
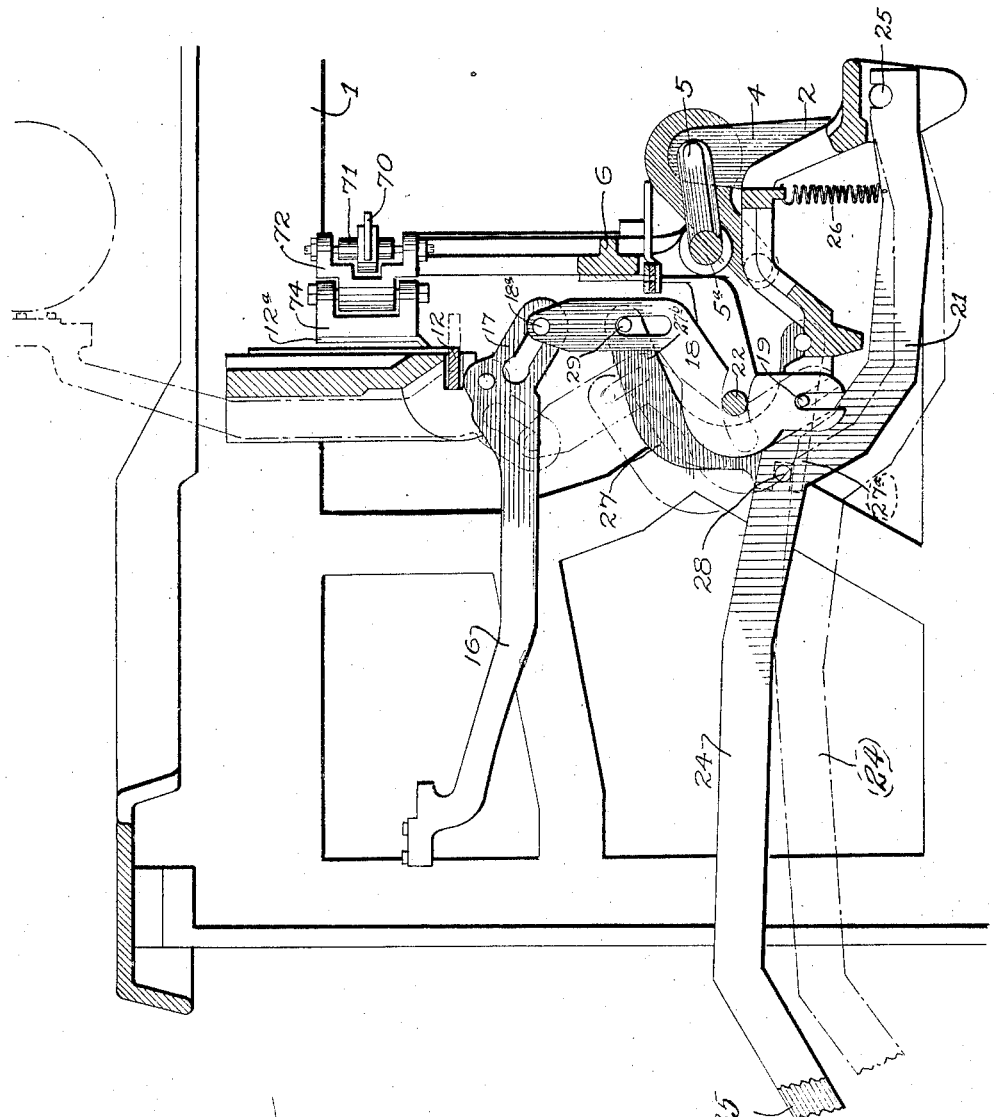
Figure 6:
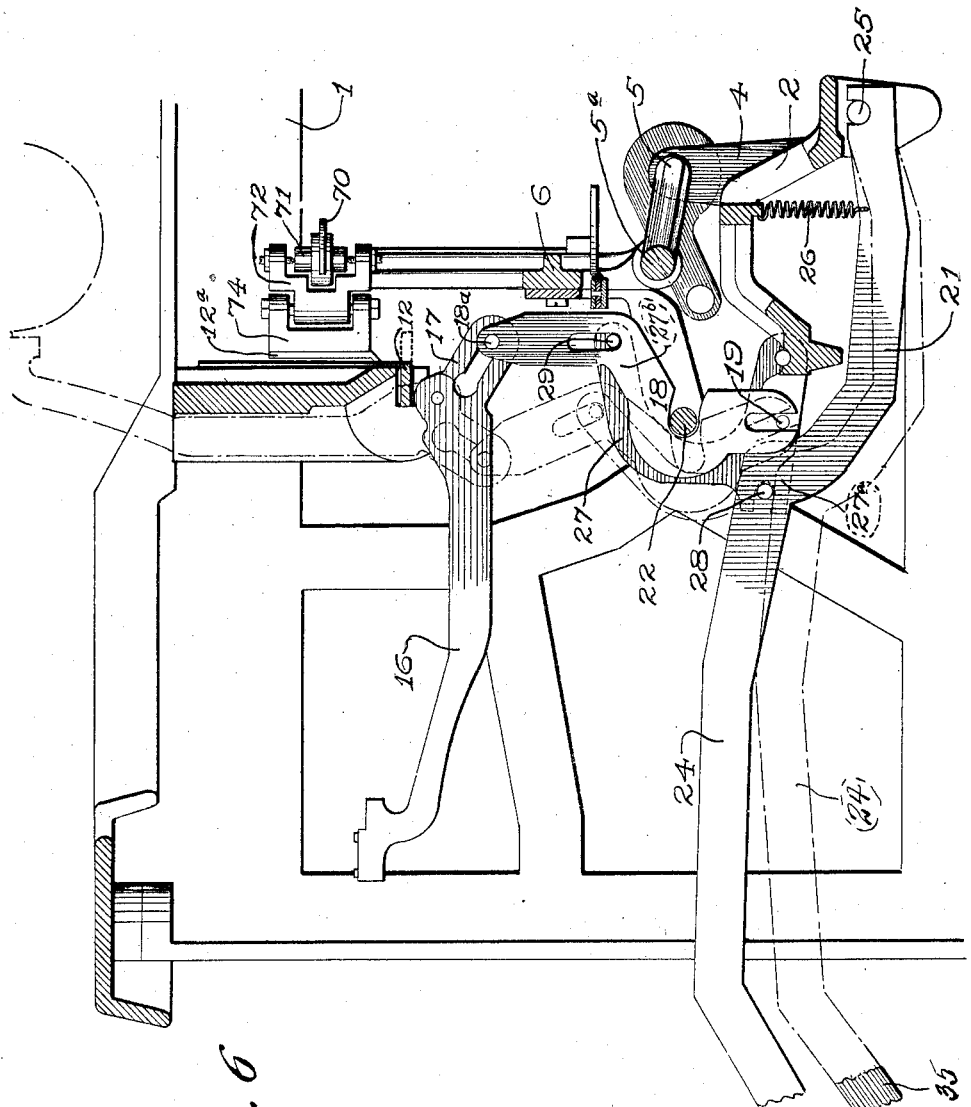

Figure 1 being a longitudinal sectional view taken substantially on the median line of the machine;

Fig. 2 a rear view;

Fig. 3 a rear view of the type basket;

Fig. 4 a top view of the type basket and certain associated parts;

Fig. 5 a detail illustrating a side elevation partly in section of the type basket mounting and type bar operating mechanism;

Fig. 6 a similar view with the type basket in shifted position;

Fig. 7 a detail illustrating the type basket shifting mechanism;

Fig. 8 a perspective illustrating the ribbon vibrating mechanism;

Fig. 9 a front elevation illustrating the ribbon vibrating and feeding mechanism;

Fig. 10 a longitudinal section of the same substantially on line 10—10 of Fig. 2, the same showing particularly the mechanism for vibrating and feeding the ribbon through operation of the computing machine;

Fig. 11 a longitudinal section substantially on line 11—11 of Fig. 2, and illustrating particularly the mechanism for vibrating and feeding the ribbon through operation of the typewriting mechanism;

Fig. 12 a top view of the ribbon feeding mechanism designed to illustrate particularly the arrangement for shifting the direction of feed of the ribbon;

Fig. 13 a detail of the same mechanism;
Fig. 14 likewise a detail of the same mechanism;
Fig. 15 a side elevation of the carriage escapement mechanism;
Fig. 16 a top view of the same;
Fig. 16ᵃ a detail of a portion of the escapement shaft.

In my copending application filed August 1, 1916, Serial No. 112,534, I have shown the billing machine of which the improvements herein described constitute a part, and it will be observed from the disclosure in that application, that the printing members of the computing machine are in the form of segments or arms which reach forwardly through portions of the typewriter mechanism below the paper carriage, and are movable into printing position relative to the platen above the type bars of the typewriter. By virtue of this arrangement the printing from the computing machine as well as the writing from the typewriter, may all be disposed on the same printing line which is visible to the operator throughout its length. This relationship of parts necessitates a novel design of typewriting mechanism, the various features of which will now be described.

*The type basket and operating mechanisms.*

The typewriters is of the type bar kind in which the type bars are carried in a shiftable frame so that they may be moved relative to the carriage to afford printing from a selected one of a plurality of types on the bar. The type basket construction will be best understood by reference to Figs. 1 to 5 inclusive.

Let numeral 1 designate generally the frame of the machine, in which is mounted a cross member 2 extending from side to side thereof and providing means of support and attachment for various parts of the mechanism. This cross member includes upstanding bearing portions 4 in which is journaled a rock shaft 5. This shaft has a portion 5ᵃ which is displaced forwardly off of the axis of the shaft's journals, somewhat after the fashion of a crank shaft. The basket frame member 6 is disposed over the offset portion 5ᵃ, and said frame has a transversely extending portion 6ᵃ from the extremities of which depend trunnion-like members 7 which aline with the extremities of the offset portion 5ᵃ, and carry trunnion screws 8 which engage in countersunk bearings in the ends of the shaft portion 5ᵃ to afford a swinging or pivotal mounting of the frame upon the rock shaft. The frame has laterally disposed arm portions 6ᵇ at its extremities and intermediate them the medial arm portions 6ᶜ likewise extending upwardly and offset forwardly at its upper portion. The medial arm portion 6ᶜ supports the type bar pivot plate or segment 9 which is a semicircular casting with its arcuate marginal portion 9ᵃ of considerable thickness to form the mounting for the type bar pivot rod and the universal bar. The segment has a medial aperture indicated at A through which the type carrying members of the computing machine operate.

Extending forwardly from the extremities of the type bar pivot plate are bracket members 10 which at their forward ends support the transversely extending arcuate type bar support 11. The type bar pivot plate 9 is provided with two concentrically arranged rearwardly opening arcuate grooves, one for the reception of the universal bar 12 and the other for the reception of the type bar pivot rod 14. The thickened portion 9ᵃ of the type bar pivot plate is also provided with the radially disposed slots 15, in each of which is mounted a type bar 16 which is pivotally supported on the pivot rod 14. At their outer extremities the type bars are supported in normal position by the arcuate support 11 upon which they fall under gravity. Just in front of its pivotal axis, each type bar has a shoulder portion 16ᵃ which is designed to make contact with the forward edge of the universal bar 12 when the type bar is swung to printing position. Extending rearwardly from its pivot, each type bar has a slotted arm 17 from which depends a pivoted link 18 having operative engagement with the arm 17 by means of a pin 18ᵃ which rides in the slot of the arm. These links 18 are pivotally supported on a pivot rod 19 which in turn is supported at its extremities on arms 20 formed on cross member 2. As best seen in Fig. 5, the engagement of links 18 with pivot rod 19 is by means of a slot in the depending extremity of each link, which form of mounting permits of vertical movement of the link relative to the pivot rod while retaining the pivotal relationship. Mounted on the forwardly projecting brackets 21 which are carried on frame 6 is a shifting rod 22, with which each link 18 has engagement by means of an arcuate slot, the disposal of which is such as to permit forward and rearward rocking movement of the link relative to the rod when the link is swung on the fulcrum afforded by pivot rod 19, but to retain the link against vertical movement relative to the shifting rod 22.

In association with each of the links 18 is a key lever 24 pivoted at 25 on the cross member 2 and drawn to normal position by spring 26. Associated with each key lever is an operating lever 27 of bell crank form, pivoted on the rod 19, and having a forwardly extending slotted arm 27ᵃ which engages a stud 28 extending laterally from the associated key lever, and a rearwardly extending arm 27ᵇ carrying a stud 29 which rides in a vertical slot in the upper portion of the associated link 18. Upon depression of the key lever 24, operating lever 27 is swung forwardly, drawing link 18 forwardly, and swinging type bar 16 to printing position, as indicated in the dot-and dash lines in Fig. 5. In this operation, the shoulder 16ª on the operated type bar engages the universal bar and presses it rearwardly.

In Fig. 7, I have illustrated the mechanism for shifting the type basket so as to change the set of type which is brought to the printing line on the printing operation. Adjacent the left hand side of the machine a crank 30 is carried on shaft 5, extending forwardly and carrying at its outer extremity a roller 31. On rod 19 is mounted a shifting lever 32 having its rearwardly extending arm formed to coöperate with the roller 31, and having its forwardly extending arm formed to coöperate with a similar roller 34 mounted on one side of the shift key lever 35. When the shift key lever is depressed, shifting lever 32 will be rocked, raising its rearward end which throws crank 30 upwardly and rotates shaft 5. This operation raises the offset portion 5ª of the shaft, lifting frame 6 and all parts carried thereby, including the type bars. This disposes the type bars in such relationship to the platen that the lower line of type on the bars will be swung to the printing line in the printing operation. The type basket is returned to normal position by gravity, a buffer spring 36 coöperating with crank 30 to ease the fall of the basket.

As a means for shifting and simultaneously locking the type basket in shifted position, I provide the shift lock which includes the key-operated bell lever 37 mounted on the frame. Arms 38 and 39 conjoined by the sleeve 40 which is pivoted on a pin 41, form a bell crank with the arm 38 coöperating with the rearward extremity of shifting lever 32, and the arm 39 operatively connected to the bell lever 37 by link 42. A spring 44 tends to retain the parts in normal position, and the depression of shift lock key 45 against the tendency of spring 44, will result in the rocking of shifting lever 32 to raise the type basket as above described. Upon this operation, the locking lever 46 pivoted to the frame at 47 and having a hooked rearward end 48, will fall into engagement with a lug 49 on the arm 39, locking said arm in its forward position and maintaining the type basket in an elevated position. The lock is released by depression of the shift key lever which carries a stud 50 which in turn coöperates with the beveled extremity of the arm 51 of the locking lever to swing the locking lever out of engagement with the lug 49 and release the parts to permit the fall of the type basket.

In Fig. 6 is shown the relationship of the various type bar operating parts when the type basket is in its elevated or shifted position. By comparison of this figure with Fig. 5, it will be observed that upon the elevation of the type basket, the links 18 are all raised vertically, by virtue of their engagement with the shifting rod 22 and as permitted by the slotted connection with the lugs 29 and the pivot rod 19. Key levers 24 and operating levers 27 retain their original position, and the latter, of course, maintain their operative engagement with links 18, by virtue of the slot and pin arrangement. The printing operation with the type basket in the shifted position is the same as with the type basket in normal position, the depression of the key levers rocking the operating levers 27 forwardly to swing the links 18 and the type bars. It will be understood, of course, that inasmuch as the type bars are arranged in an arcuate disposal, so that those at the extremities of the basket are considerably higher than those in the middle, the necessary variation in the length of the vertical arms of the links 18 will be made to afford connection with the type bars, which latter have their rear arms 17 of uniform length.

By virtue of the features of construction just described, it will be seen that the convenience and economy of a single keyboard may be maintained while the proper definite printing line relationship of platen and printing mechanism of the computing machine is always preserved. Furthermore, the type operating mechanism gives a uniformly light touch and rapid action.

*The carriage escapement mechanism.*

This mechanism will be described with particular reference to Figs. 5, 15, and 16.

Referring first to Fig. 1, however, it will be understood that the carriage is made up of side frames 50 which are connected by track bars 51, tabulator bar 52, and other longtudinally extending members, and in which side frames are mounted the platen 54 and the portions associated therewith for handling the paper. The lower track bar 51 rides on rollers 55 mounted on the frame, and the upper track bar on balls 56, which are carried in a ball race on the frame. The carriage is equipped with a longitudinal rack 57 with which meshes a pinion 58 which is carried at the upper end of the escapement shaft 59 which is flexibly journaled in a bracket 60. Escapement shaft 59 carries the escapement or ratchet wheel 61. A vibrating shaft 62 is mounted on the frame members 64, and carries the pallet mechanism 65 which coöperates with the escapement wheel 61 to permit its step by step escapement movement under the tension imparted to the carriage by the conventional spring drum arrangement 63 (see Fig. 2.) A spring 66 tends to maintain the shaft 62 and its carried elements in normal position and engagement with the escapement wheel, and a lever arm 67 depending from the shaft 62 affords means whereby the latter may be rocked to vibrate the pallets to permit the escapement movement.

As will be seen best in Figs. 3 and 4, the lateral arm 6<sup>b</sup> of the type basket carries vertical rock shafts 68. Adjacent their lower extremities these vertical rock shafts carry arms 69 which are pivotally connected at 69<sup>a</sup> in front of a line drawn from one shaft to the other, so that said arms form a sort of toggle connection whereby when one shaft is rocked on its axis the rocking movement will be transmitted to the other shaft. Adjacent their upper extremities the shafts 68 carry inwardly presented arms 70, and at the inner extremity of each of said arms 70 is carried a pivot block 71 (see Fig. 5). A yoke member 72 pivotally supports the pivot block 71, and in turn is pivoted to a connecting member 74. To this connecting member 74 is attached the universal bar 12, connection between the two being made, if desired, by means of an integral ear portion 12<sup>a</sup> on the universal bar being attached by screws to the connecting member 74. Extending rearwardly from the right hand rock shaft 68 is an arm or lever 75, which is maintained under tension to the left by a spring 76. This arm 75 extends rearwardly into cooperative association with the vibrating arm 67.

It has been explained above how the operation of a type bar moves the universal bar 12 rearwardly. This movement of the universal bar, by virtue of the toggle-like or free double-jointed form of connection through connecting member 74, yoke 72 and pivot block 71, will swing the arms 70 rearwardly, thus rocking the vertical rock shafts 68. This rocking movement will swing arm 75 outwardly or to the right, in which movement it will rock lever arm 67. This, of course, will rock vibrating shaft 62 and manipulate the escapement pallets to release the escapement wheel and permit the first half-step movement of the carriage. When the pressure of the type bar is removed from the universal bar, the latter is retracted to normal position, and the lever 75 swung leftwardly, permitting the return of the lever arm 67 and vibrating shaft to permit the full escapement of the carriage and complete the letter-spacing operation. There is sufficient room for lost motion between the arm 75 and lever arm 67 to allow for the printing of the letter before the escapement pallets receive their first movement. This mounting of the escapement bar on arms from the vertical rock shafts 68, and the toggle connection between these rock shafts by virtue of the levers 69, maintains the universal bar in alinement throughout its length at all times and insures bodily right-line movement no matter by what type bar it may be operated. This insures uniformity of touch on all of the key levers.

Escapement from the space bar is accomplished through the connections disclosed in Fig. 15 wherein the numeral 73 designates the space bar lever, and 77 designates a rock bar extending across the machine over the key levers and pivoted on the opposite side frames at 77<sup>a</sup>. The part of rock bar 77 intermediate its terminal extremities is offset and on either side of its middle is connected to one of the space bar levers by means of short lugs 78 which engage above and below a projection 79 extending from the rock bar 77. Coaxially with its pivots 77<sup>a</sup> the rock bar carries at its right end an arm 80 which has pin connection with a slotted link 81. This link in turn is pivotally connected to a laterally extending arm 82 carried by the right hand rock shaft 68. When the space bar is depressed, the lever 76 will be rocked downwardly, the rock bar 77 rocked on its pivots so as to swing the lever 80 forwardly, which in turn, through the link and lever connection, rocks the shaft 68 so as to effect the escapement operation as above described. The slot connection between lever 80 and link 81 is for the purpose of permitting the forward movement of the latter when the rock shaft 68 is operated from a key lever, during which operation, of course, the lever 80 is stationary.

By virtue of the mechanisms just above described, a positive operation of the carriage escapement is attained both from the operation of printing keys and the space bar. Rock shaft 68 being carried by the frame of the type basket, insures uniformity of operation in both printing positions of the type basket.

*The ribbon manipulating mechanism.*

The machine is designed so that a single ribbon will be used in common by both the printing mechanism of the computing machine and the printing mechanism of the typewriting machine. Provision, therefore, is made for vibration of the ribbon to and from the printing line upon the printing operation of either mechanism, longitudinal feed of the ribbon upon operation of either mechanism in the printing operation, automatic reversal in the direction of feed of the ribbon, and a means for changing the ribbon vibrating operation so that the printing may be done selectively from either color zone of a bichrome ribbon. The construction of the ribbon manipulating mechanism will be understood by reference to Figs. 8 to 14 inclusive. Referring first to Fig. 9, it will be observed that spool shafts 90 are journaled in brackets 91, one at each side of the machine, said shafts being vertically disposed and having their upper extremities extending above the cover plate of the machine, where they support the spools 94 at a level slightly below the printing line. The ribbon 95 passes from one spool to the other along the front of the paper carriage just below the printing line, being operatively engaged by vibrating guides 96, one at each side of the printing area. These vibrating guides are carried on slideways 97 which are supported on the frame cover plate, the connection being such that the guides have vertical sliding movement thereon. Depending bracket members 98 afford supports for the pivotal mounting of the vibrating levers 99 and 99'; the former having slot and pin connection with the left hand vibrating guide 96 and the latter having slot and pin connection with the right hand guide 96. The mounting of the vibrating levers on the brackets 98 is also by means of a slot and pin connection, so that the levers may be shifted longitudinally with reference to the brackets and the vibrating guides. The fulcrum pin $y$ of the lever 99 is carried on a longitudinally movable link 100, while the fulcrum pin $y'$ of the vibrating lever 99' is carried on a longitudinally shiftable link 101. A cam plate 102 is longitudinally shiftable by operation of the ribbon shift key which is disposed in the keyboard, the lever of which is shown at 104, and which is connected by a link 105 to a bell lever 106 pivoted at $106^a$ and having its other arm connected to the cam plate 102. The cam plate is provided with a diagonally inclined cam slot 107 in which operates a pin 108 carried by shiftable link 100. Cam plate 102 has a second diagonally inclined cam slot 109 in which operates a pin 110 carried by shiftable link 101. Longitudinal movement of cam plate 102 upon operation of ribbon shift key lever 104, will move shiftable links 100 and 101 longitudinally so as to shorten the power arms of vibrating levers 99 and 99'. The power arm of vibrating lever 99 is under control of a crank 111 carried on a shaft 112 which is rocked by a connecting rod 114. Similarly the power arm of vibrating lever 99' is controlled by crank 115 carried on a shaft 116 which is rocked by the connecting rod 117.

Referring to Figs. 9, 10 and 11, it will be observed that connecting rods 114 and 117 are actuated for longitudinal reciprocation by movement of a sleeve 118, to which connecting rods 114 and 117 are connected respectively by crank arms 119 and 120. This sleeve 118 is arranged to be rocked on its axis by virtue of its connection through crank arm 121, and link 122 with print control lever $X^{49}$ of the computing machine. By virtue of the connections as described in my copending application above referred to, this print control lever $X^{49}$ governs the operation of the printing hammers which effect the printing from the number type of the computing machine. For the purpose of the present explanation, it is sufficient to state that this print control lever $X^{49}$, which is pivoted at $X^{50}$, and held under tension by the spring $X^{52}$, is rocked by the influence of said spring at every printing operation of the computing machine. It will be seen that in this rocking operation the lower end of lever $X^{49}$ is swung rearwardly, or to the left, as illustrated in Fig. 10. At such times when no printing is to be effected from the computing machine number types, as when items are simply accumulated and not listed, this lever remains stationary. As a consequence, upon every printing operation of the computing mechanism, sleeve 118 will be rocked, and, by virtue of the operating connections just above described, both of the vibrating guides 96 will be raised to carry the ribbon to the printing line to receive the impact of the type. This raising of a considerably longer extent of the ribbon is necessary when the computing machine printing mechanism is operated, by virtue of the fact that the printing members of the computing machine cover a considerable extent transversely, the extent depending, of course, upon the number of denominational orders for which the machine is equipped. In the operation of the typewriting mechanism, however, raising of this considerable extent of ribbon is not necessary, as but a single letter is printed at a time, nor is the raising of this considerable extent of ribbon desirable in the operation of the typewriter, for the reason that it would make the operating touch heavier. Accordingly, the vibration of the ribbon upon operation of the typewriting mechanism is accomplished through the instrumentality of the connection between shaft 116 and rock shaft 68 formed by crank 124, thrust link 125 and arm 126. It will be recalled that the rock shaft 68 is rocked through its connection with the universal bar upon operation of any type bar, and, as shaft 116 is effective only upon vibrating lever 99', only the right hand vibrating guide 96 will be raised upon operation of the typewriter printing mechanism. As will be seen in Fig. 9, the printing point of the typewriting mechanism is adjacent to the right hand vibrating guide 96, so that the movement of the single guide elevates enough of the ribbon to effect the printing from the type bar.

I have explained above how the power arms of levers 99 and 99' are shortened by the shifting of cam plate 102. Inasmuch as the arc of movement of cranks 111 and 115 is always the same, a shortening of the power arms on the vibrating levers will result in their weight arms being given an increased extent of movement. Hence, when printing from the upper zone of a bichrome ribbon, the levers 99 and 99' will be in the positions illustrated in Fig. 8, whereas when it is desired to print from the lower color zone of a bichrome ribbon, said levers will be shifted outwardly as above described and the vibrating guides 96, as a consequence, will be given a greater extent of vertical movement so as to bring the lower zone of the ribbon over the printing line in the vibrating operation.

Referring now to Figs. 9 to 14 inclusive, I will describe the ribbon feeding mechanism.

Journaled in brackets 130 is a ribbon feeding shaft 131 having loosely journaled on each end thereof a clutch pinion 132. Each clutch pinion meshes with a beveled pinion 134 on its associated vertical shaft 90. Slidably mounted on shaft 131, but held for rotation therewith, are the shiftable clutch members 135, one arranged for coöperation with each of the clutch pinions 132. These shiftable clutch members are controlled in their movement longitudinally of the shaft by clutch levers 136 pivoted at 136$^a$ and linked together by a rod 137 so that they are maintained in parallelism. One of the clutch levers 136 has an extension 138 with a toothed extremity arranged for coöperation with the spring pressed detent 139. Upon shaft 131 are carried similar ratchet wheels 140 and 140'. With the former ratchet wheel coöperates a spring pressed pallet 141, and with the latter a spring pressed pallet 142. The former is carried on an arm 144 which is oscillated by a shaft 145 mounted at the left side of the machine. This shaft is rocked from the left hand vertical rock shaft 68 through the instrumentality of an arm 146 mounted on the shaft 68 and connected to an arm 147 on shaft 145 by means of a link 148. Consequently, whenever shaft 68 is rocked, as occurs upon any actuation of the universal bar, shaft 145 will be rocked, and pallet 141 will be reciprocated to rotate ratchet wheel 140, the power for the rotation of said ratchet wheel being derived from the carriage spring, and from the restoration under gravity of the several articulated operating parts. Pallet 142 is carried on a rocking arm 149 which is swung by a connecting crank 150 which is mounted on sleeve 118 and oscillated upon rotation thereof. Hence whenever sleeve 118 is rotated, as is effected by the printing operation of the calculating machine, pallet 142 will be reciprocated to rotate ratchet wheel 140'. Whether actuated through ratchet wheel 140 or by ratchet wheel 140', shaft 131 will always be rotated in the same direction, and will carry with it whichever of clutch pinions 132 may be clutched to it. Whichever clutch pinion is clutched to shaft 131 will drive its associated beveled pinion 134 and ribbon shaft 90 to wind the ribbon on the reel supported on that shaft. The other clutch pinion being free on shaft 131, will leave its associated driven shaft 90 free to rotate to permit the unwinding of the ribbon from the reel supported thereon.

When the ribbon becomes exhausted from one reel, it is desirable, of course, to have automatic arrangement for reversing the direction of feed so that the ribbon may be fed from the full spool to the empty spool. By reference to Fig. 14, it will be observed that the ribbon spool has a drum portion 151 having a part of its curved wall in the form of a gate 152 which is pivoted at 152$^a$, and urged toward open position by spring 154. The free end of this gate carries a downwardly projecting stud 155 which operates through an arcuate slot 156 in the lower disk of the spool. The end of the ribbon is attached to a stationary portion of the drum, and when any of the ribbon is wound on the drum 151, the gate 152 will be held in its closed position thereby. However, when the ribbon is unwound from the drum 151 so as to leave the gate 152 unrestrained, it will swing outwardly under the influence of the spring 154 as described. Terminating under the lower disk of the ribbon spool is a tripping shaft 157 which is journaled at its lower end on the frame 130. At its upper extremity this shaft carries a tripping cam piece 158 lying below the ribbon spool and having a camming edge 159 disposed eccentrically relative to the ribbon shaft 90. When the gate 152 is in its closed position, the lower end of pin 155 will be revolved short of the cam piece 158. When, however, the gate is opened and the radial distance of pin 155 from shaft 90 is increased, said pin 155 will be in position to ride over the camming edge 159. In so doing, it will swing the cam piece 158 inwardly, rocking the shaft 157. At its lower extremity, shaft 157 carries a detent arm 160 which coöperates with a swinging wedge piece 161 flexibly journaled on the frame 130. As best seen in Fig. 13, the detent arm 160 overlies a rear portion of the wedge piece 161 so as to hold its forward end elevated against influence of spring 162. The forward end of the wedge piece 161 is arranged for coöperation with the laterally extending arm 136$^b$ of the clutch lever 136 and also with the teeth 164 of a cam member 165 carried by shaft 131 which operates adjacent to the clutch lever 136. The spacial relationship of cam 165 and clutch lever 136 is such that when the clutch is engaged the teeth 164 and the lateral projection 136$^b$ will be separated by a distance sufficient to accommodate the width of wedge piece 161 between the high points of the teeth and the end of extension 136$^b$. When, however, the clutch members are disengaged, the lateral projection 136ᵇ will be swung toward the cam member 165 to such an extent that there is not room for the width of wedge piece 161 between them. The teeth 164 have sloping camming edges on their forward sides and, when shaft 157 is rocked as above described, so as to throw detent arm 160 out of engagement with wedge piece 161, the forward end of the latter will be pressed downwardly and toward cam 165 by action of its spring 162, and the space intermediate the cam teeth 164 will permit the forward extremity of wedge piece 161 to take a position in front of the end of lateral projection 136ᵇ. Upon the continued rotation of cam 165, however, the sloping face of the advancing tooth 164 will engage a side of wedge piece 161 and cam it laterally against lateral projection 136ᵇ and thereby swing clutch lever 136 on its pivot so as to engage its associated clutch member with the coöperating clutch pin. This movement, of course, by virtue of the connecting rod 137, swings the other clutch lever 136 to disengage the clutch members at the other end of the shaft 131. This will transfer the driving operation from the shaft 90 carrying the full spool to the other shaft 90 carrying the empty spool, so that the direction of feed of the ribbon will be reversed.

By virtue of the ribbon handling mechanisms above described, I secure the vibration of the necessary amount of ribbon for the calculating machine printing mechanism, without increasing the operating pressure of the typewriter keys. Likewise, the ribbon vibrating and feeding operations are uniform in both positions of the type basket. Furthermore, by virtue of the arrangement described, the vibration of the ribbon may be altered by manipulation of a key in the keyboard, which may be one of the keys of the adding mechanism as a final total key, the operation of which would automatically cause the printing of a final total in red. By virtue of the ribbon feeding arrangement, the ribbon will be fed longitudinally upon every printing operation of either the typewriting or calculating mechanism, but will not be fed upon non-listing operations of the latter.

As illustrated in Fig. 16, it will be understood that X¹⁹ represents the vibrating plate which is associated with the key-operated setting-up mechanism of the calculating machine in such fashion that whenever a key is struck to insert a digit, said vibrating plate X¹⁹ will be rocked upwardly to permit the escapement of the pin carriage of the calculating mechanism, all as described on pages 12 and 13 of my copending application, Serial Number 112,534 for calculating machine.

Slidably supported on a trunnion 274 projecting rearwardly from the frame 1 is a crank member 275, one arm of which carries a rod extending forwardly over the escapement pallet 65, and the other arm of the crank member carries a rearward projection 276 which is adapted to be moved over the forward extremity of the vibrating plate X¹⁹. Suitable means (not shown), preferably a pivotally mounted member having a portion projecting exteriorly of the frame 1 for manual manipulation, is adapted to shift the crank member 275 rearwardly or forwardly, in the former of which positions the projection 276 lies over the vibrating plate X¹⁹. In this position whenever the vibrating plate is raised by the operation of a number key of the calculating mechanism, crank member 275 will be rocked so that rod 273 will depress pallet mechanism 65 and permit the escapement of the carriage. When crank member 275 occupies its forward position, the rearward projection is removed from the path of vibrating plate X¹⁹, so that the carriage escapement mechanism is not operated upon the operation of a number key.

While my various improvements as above described, reside in various features of the typewriter mechanism, particularly such features as secure various coöperating functions between the typewriting and calculating mechanisms, I am aware that my inventions are not limited to the particular structures shown and described, but that the latter are susceptible of various changes, modifications and adaptations not herein specifically referred to, but comprehended nevertheless within the intended scope of the appended claims.

I do not claim herein the improvements relating to the interlocking arrangement for the carriage return and tabulating mechanisms, the ribbon vibrating mechanism, or the automatic line-spacing mechanism, the same forming the subjects-matter of and being claimed in my copending divisional applications Serial Numbers 169,582 now Patent No. 1,256,076 for carriage mechanism for writing machines, 169,583 now Patent No. 1,256,077 for ribbon vibrating mechanism, and 169,584 for platen operating mechanism, all filed May 18, 1917.

What I claim is:

1. In a machine of the class described, a type basket mechanism including a shiftably mounted frame, type bars pivoted therein, a universal bar mounted on the frame and operable by the type bars, rock shafts mounted on the frame and having pivotal connection with the universal bar whereby they are rocked upon movement of the latter, link connections between the rock shafts for equalizing their movements, operating means for the type bars, and means for transmitting movement from the rock shafts.

2. In a typewriter, a type basket mechanism including a frame mounted for shiftable movement, type bars mounted therein, a universal bar mounted therein and operable by the type bars, a rock shaft mounted in the frame adjacent each extremity of the universal bar, a pivotal connection operably connecting each of said shafts with the universal bar, and means for transmitting movement from the rock shaft.

3. In a machine of the class described, a type basket mechanism including a shiftably mounted frame, type carrying members mounted in said frame, a universal bar coöperating with said type-carrying members, a rock shaft mounted in said frame adjacent each extremity of the universal bar, a crank connection between the universal bar and each of said rock shafts, a link connection between the rock shafts for equalizing movement between the two, and means for transmitting movement from the rock shafts.

4. In a machine of the class described, the combination of a carriage including escapement mechanism, type-carrying members disposed in mountings shiftable relative to the carriage, a universal bar coöperating with said type-carrying members, rock shafts operated by the universal bar and shiftable with the type-carrying members, link connections between the rock shafts for equalizing their movements, and a pair of coöperating relatively shiftable vibrating arms, one carried by one of the rock shafts and one carried by the escapement mechanism, whereby operative movement may be transmitted from the rock shaft to the escapement mechanism.

5. In a typewriter, a platen, a segment movable vertically with respect to said platen, a series of type bars pivotally mounted on said segment, a universal bar arranged upon said segment and movable from any one of the type bars, a vertically movable frame supporting said segment, rock shafts journaled near the ends of said frame, operating connections between the universal bar and said rock shafts, connections between the rock shafts for equalizing the movement of the escapement mechanism for the platen, and means carried by one of the rock shafts and adapted to engage a part of said escapement mechanism when the rock shafts are actuated.

6. In a typewriter, a platen, a segment movable vertically with respect to said platen, a series of type bars pivotally mounted on said segment, a universal bar arranged upon said segment and movable from any one of the type bars, a vertically movable frame supporting said segment, rock shafts journaled near the ends of said frame, operating connections between the universal bar and said rock shafts, connections between the rock shafts for equalizing the movement of the escapement mechanism for the platen, means carried by one of the rock shafts and adapted to engage a part of said escapement mechanism when the rock shafts are actuated, a space key, and operating connections from said space key to one of said rock shafts.

7. In a typewriter, a platen, a segment movable vertically with respect to said platen, a series of type bars pivotally mounted on said segment, a universal bar arranged upon said segment and movable from any one of the type bars, a vertically movable frame supporting said segment, rock shafts journaled near the ends of said frame, operating connections between the universal bar and said rock shafts, connections between the rock shafts for equalizing the movement of the escapement mechanism for the platen, means carried by one of the rock shafts and adapted to engage a part of said escapement mechanism when the rock shafts are actuated, a shift key lever, and means adapted to be actuated thereby for elevating the vertically movable rock shaft carrying frame.

8. In a typewriter, a platen, a segment movable vertically with respect to said platen, a series of type bars pivotally mounted on said segment, a universal bar arranged upon said segment and movable from any one of the type bars, a vertically movable frame supporting said segment, rock shafts journaled near the ends of said frame, operating connections between the universal bar and said rock shafts, connections between the rock shafts for equalizing the movement of the escapement mechanism for the platen, means carried by one of the rock shafts and adapted to engage a part of said escapement mechanism when the rock shafts are actuated, a shift key lever, means adapted to be actuated thereby for elevating the vertically movable rock shaft carrying frame, and key operated means for locking the vertically movable frame in its elevated position.

In testimony whereof I hereunto affix my signature this 23d day of September, 1916.

OTTO THIEME.